(12) United States Patent  
Jaradi et al.

(10) Patent No.: US 12,162,426 B2
(45) Date of Patent: Dec. 10, 2024

(54) FOUR-POINT VEHICLE HARNESS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/306,392

(22) Filed: Apr. 25, 2023

(65) Prior Publication Data

US 2024/0359653 A1 Oct. 31, 2024

(51) Int. Cl.
| | |
|---|---|
| *B60R 22/06* | (2006.01) |
| *A61G 3/08* | (2006.01) |
| *B60R 22/18* | (2006.01) |
| *B60R 22/20* | (2006.01) |
| *B60R 22/24* | (2006.01) |

(52) U.S. Cl.
CPC .......... *B60R 22/201* (2013.01); *A61G 3/0808* (2013.01); *B60R 22/18* (2013.01); *B60R 22/20* (2013.01); *B60R 22/24* (2013.01); *B60R 2022/208* (2013.01)

(58) Field of Classification Search
CPC ......... B60R 22/03; B60R 22/04; B60R 22/06; B60R 22/18; B60R 22/20; B60R 22/22; B60R 22/24; B60R 22/201; B60R 2022/021; B60R 2022/1818; B60R 2022/207; B60R 2022/208; A61G 3/08; A61G 3/0808; A61G 3/0866
See application file for complete search history.

(56) References Cited

U.S. PATENT DOCUMENTS

| | | | |
|---|---|---|---|
| 4,437,683 A | | 3/1984 | Moriya et al. |
| 5,026,225 A | * | 6/1991 | McIntyre ............. A61G 3/0808 |
| | | | 280/808 |
| 8,016,318 B2 | * | 9/2011 | Nezaki ................... B60N 2/688 |
| | | | 280/808 |
| 8,251,400 B2 | | 8/2012 | David et al. |
| 9,434,349 B1 | * | 9/2016 | Perkins ................... B60R 22/03 |
| 10,130,529 B2 | | 11/2018 | Gale |
| 10,688,959 B2 | * | 6/2020 | Bryant ..................... B60R 22/00 |

(Continued)

FOREIGN PATENT DOCUMENTS

| | | |
|---|---|---|
| CN | 201249730 Y | 6/2009 |
| CN | 106740648 A * | 5/2017 |

(Continued)

*Primary Examiner* — Barry Gooden, Jr.
(74) *Attorney, Agent, or Firm* — Frank A. MacKenzie; Bejin Bieneman PLC

(57) ABSTRACT

A vehicle includes a vehicle body. The vehicle includes a first track and a second track supported by the vehicle body. The first track and the second track are elongated along a longitudinal axis. The vehicle includes a third track and a fourth track supported by the vehicle body. The third track and the fourth track are elongated along a vertical axis. The vehicle includes a harness having a first webbing movable along the first track, a second webbing movable along the second track, a third webbing movable along the third track, and a fourth webbing movable along the fourth track.

20 Claims, 12 Drawing Sheets

(56) References Cited

U.S. PATENT DOCUMENTS

| | | |
|---|---|---|
| 10,889,261 B1 * | 1/2021 | Charopoulos .......... B60N 2/002 |
| 10,933,839 B2 | 3/2021 | Jaradi et al. |
| 11,364,872 B1 * | 6/2022 | Jaradi ................... B60R 21/214 |
| 11,590,921 B1 * | 2/2023 | Farooq .............. B60R 21/23138 |
| 11,673,524 B1 * | 6/2023 | Faruque ................ B60R 21/233 |
| | | 280/735 |
| 11,702,026 B2 * | 7/2023 | Jaradi .................. B60R 21/231 |
| | | 280/753 |
| 12,012,075 B1 * | 6/2024 | Faruque .................. B60N 2/01 |
| 12,042,442 B1 * | 7/2024 | Jaradi ................. A61G 3/0808 |
| 2002/0089164 A1 * | 7/2002 | Rouhana ................ B60R 22/02 |
| | | 280/801.1 |
| 2009/0309344 A1 * | 12/2009 | van Roosmalen ...... B60R 22/03 |
| | | 280/801.1 |
| 2014/0303851 A1 * | 10/2014 | Nagasawa, Sr. ...... B60R 22/201 |
| | | 701/45 |
| 2015/0232061 A1 * | 8/2015 | Cuddihy ............. B60R 16/037 |
| | | 701/45 |
| 2016/0311399 A1 * | 10/2016 | Miller .................. B60R 22/201 |
| 2020/0010046 A1 * | 1/2020 | Sugamata ............ B60R 22/201 |
| 2020/0148161 A1 * | 5/2020 | Jaradi .................... B60R 22/48 |
| 2021/0393456 A1 * | 12/2021 | Kato ...................... B60N 2/245 |
| 2022/0096289 A1 * | 3/2022 | Jaradi ................. B60R 16/0207 |
| 2022/0134991 A1 * | 5/2022 | Farooq ................. B60R 21/232 |
| | | 280/730.1 |
| 2023/0080246 A1 * | 3/2023 | Jaradi .................... B60R 21/08 |
| | | 280/753 |
| 2023/0158992 A1 * | 5/2023 | Faruque ................ B60R 21/213 |
| | | 280/735 |
| 2023/0373431 A1 * | 11/2023 | Farooq ................. B60R 21/231 |

FOREIGN PATENT DOCUMENTS

| | | | | |
|---|---|---|---|---|
| CN | 112406778 A | * | 2/2021 | ........... A61G 3/0808 |
| CN | 117734627 A | * | 3/2024 | ........... A61G 3/0808 |
| DE | 3719656 A1 | * | 12/1987 | |
| DE | 20106036 U1 | | 8/2002 | |
| EP | 1591327 A1 | * | 11/2005 | ............. B60R 22/02 |
| GB | 2200529 A | * | 8/1988 | ........... A61G 3/0808 |
| JP | 2009269550 A | | 11/2009 | |
| WO | WO-9202389 A1 | * | 2/1992 | |

\* cited by examiner

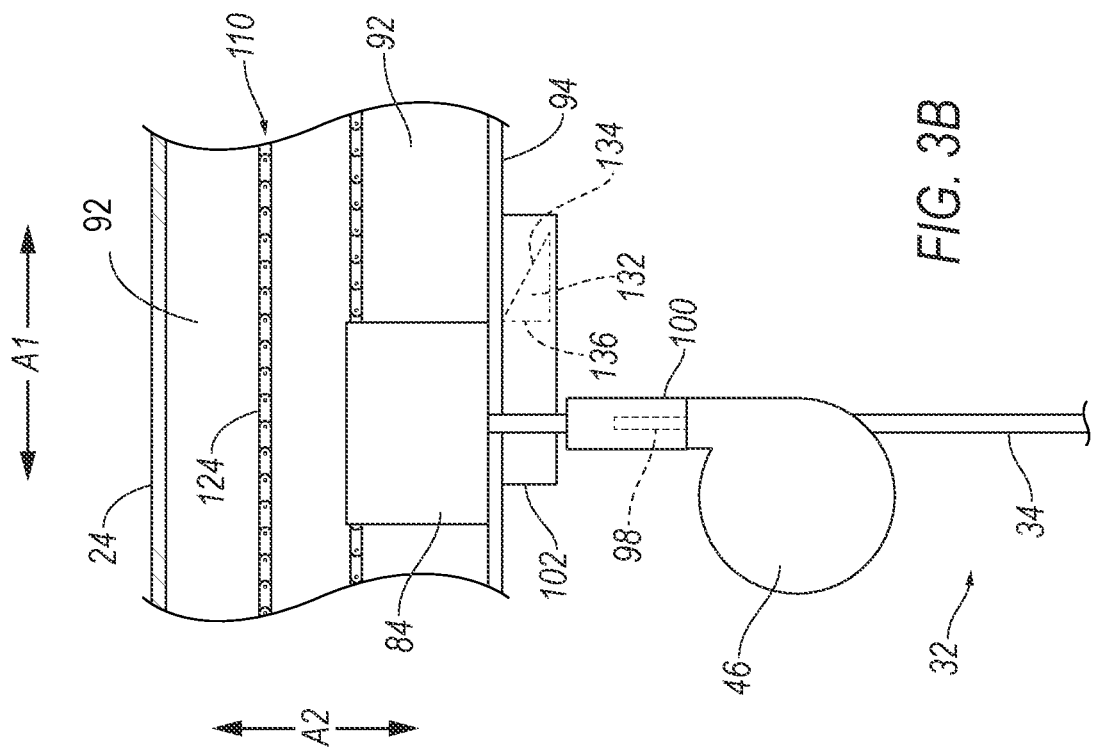
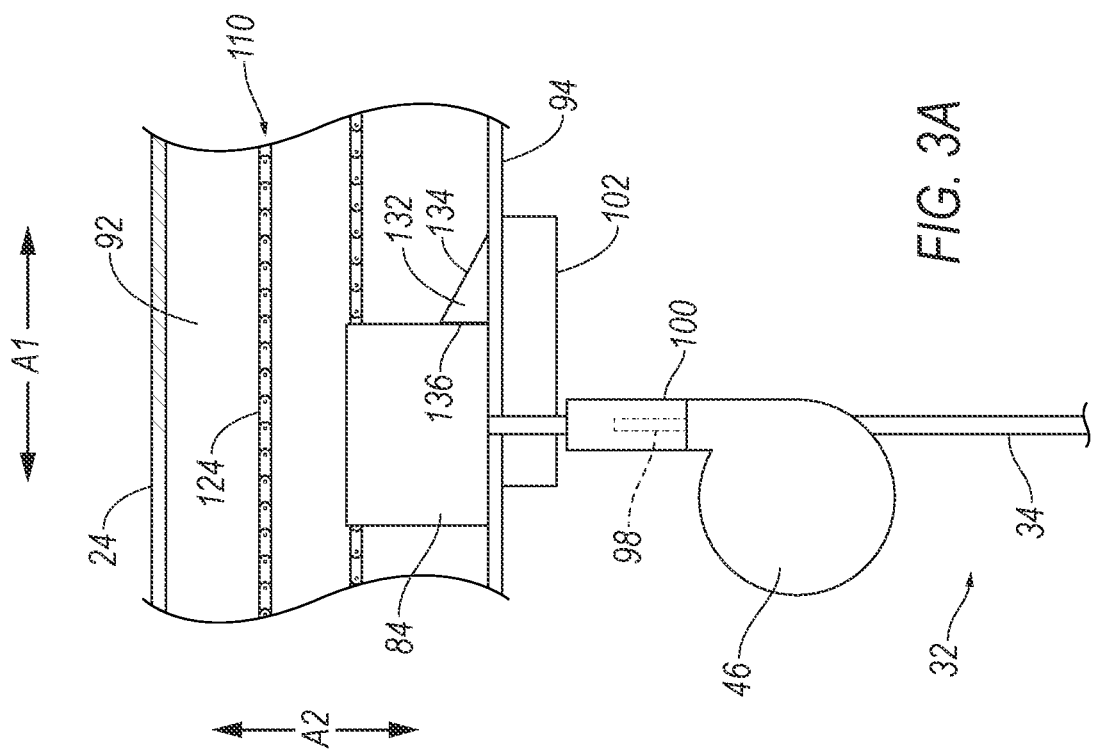

FOUR-POINT VEHICLE HARNESS

BACKGROUND

A vehicle may include one or more systems to control kinematics of an occupant of the vehicle during certain vehicle impacts. The systems to control kinematics may include, for example, airbag and seatbelt assemblies.

BRIEF DESCRIPTION OF THE DRAWINGS

FIG. 3A is a diagrammatic cross section view of a portion of the track supported by the roof with the harness at a second position and a tooth at an extending position.

FIG. 3B is a diagrammatic cross section view of the portion of the track supported by the roof with the harness at the second position and the tooth at a retracted position.

DETAILED DESCRIPTION

Figure 1:
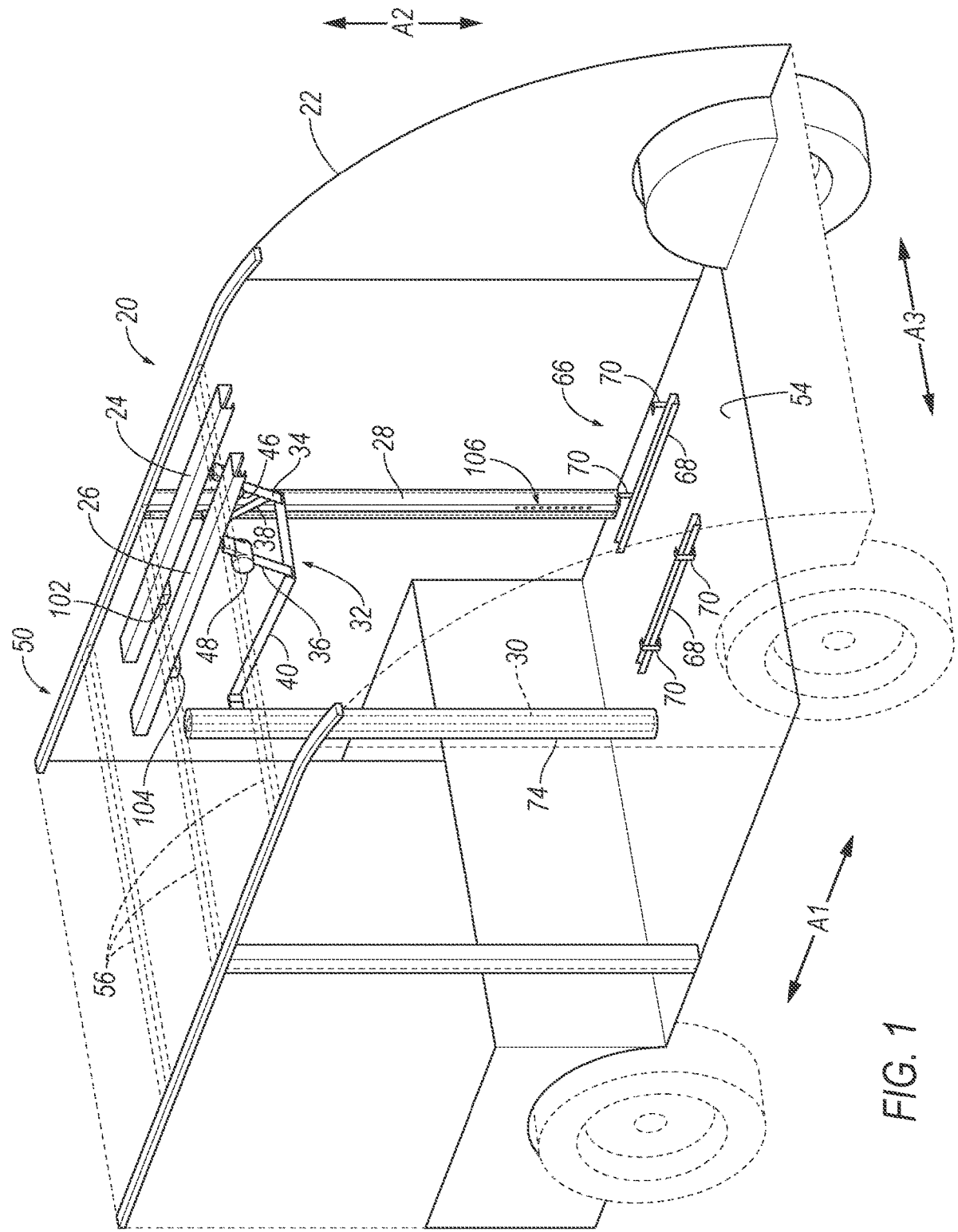
FIG. 1 is a diagrammatic perspective view of a vehicle with a harness in a first position.

A vehicle includes a vehicle body. The vehicle includes a first track and a second track supported by the vehicle body, the first track and the second track elongated along a longitudinal axis. The vehicle includes a third track and a fourth track supported by the vehicle body, the third track and the fourth track elongated along a vertical axis. The vehicle includes a harness. The harness has a first webbing movable along the first track, a second webbing movable along the second track, a third webbing movable along the third track, and a fourth webbing movable along the fourth track.

The vehicle may include a computer having a processor and a memory storing instructions executable by the processor to move the third webbing and the fourth webbing away from top ends of the third track and the fourth track toward a floor of the vehicle body.

The instructions may include instructions to move the first webbing and the second webbing away from front ends of the first track and the second track toward rear ends after moving the third webbing and the fourth webbing downward.

The instructions may include instructions to move the first webbing, the second webbing, the third webbing, and the fourth webbing in response to detecting an occupant under the first track and the second track and between the third track and the fourth track.

The vehicle may include a first retractor movable along the first track and a second retractor movable along the second track, the first webbing extending from the first retractor, and the second webbing extending from the second retractor.

The first retractor and the second retractor may be releasably engaged with the first track and the second track.

The first webbing and the second webbing may be movable from first positions to second positions that are rearward of the first positions, and the vehicle may include a first stop and a second stop that maintains the first webbing and the second webbing at the second positions.

The vehicle may include an actuator configured to move the first webbing along the first track.

The actuator may include a motor coupled to a worm gear.

The vehicle may include a floor mount fixed to the vehicle body under the first track and the second track and between the third track and the fourth track.

The vehicle may include a personal mobility device secured to the floor mount.

The floor mount may include channels engageable with wheels of a personal mobility device.

The vehicle body may include a first pillar and a second pillar spaced from each other along a lateral axis, the third track supported by the first pillar.

The vehicle may include a center pillar between the first pillar and the second pillar along the lateral axis, the fourth track supported by the center pillar.

The center pillar may include a frame and a cover, the fourth track supported by the frame under the cover.

The cover may include a slit extending along the fourth track.

The vehicle may include a stop that limits movement of the third webbing along the third track away from the second position.

The vehicle may include a headliner supported by the vehicle body, the headliner having a first slit extending along the first track and a second slit extending along the second track.

With reference to the Figures, wherein like numerals indicate like parts throughout the several views, a vehicle 20 with a harness 32 for controlling kinematics of an occupant 42 is shown. While four-point harness currently may not be approved for use in passenger vehicles, it is anticipated that the regulatory framework may evolve in the future such that use of four-point harnesses becomes safe and permissible.

The vehicle 20 includes a vehicle body 22. The vehicle 20 includes a first track 24 and a second track 26 supported by the vehicle body 22. The first track 24 and the second track 26 are elongated along a longitudinal axis A1. The vehicle 20 includes a third track 28 and a fourth track 30 supported by the vehicle body 22. The third track 28 and the fourth track 30 are elongated along a vertical axis A2. The harness 32 has a first webbing 34 movable along the first track 24, a second webbing 36 movable along the second track 26, a third webbing 38 movable along the third track 28, and a fourth webbing 40 movable along the fourth track 30.

In the present description, relative vehicular orientations and directions (by way of example, top, bottom, front, rear, forward, rearward, outboard, inboard, inward, outward, lateral, left, right, etc.) is from the perspective of an occupant seated in the vehicle 20 facing forward, e.g., toward a forward instrument panel and/or forward windshield of the vehicle 20. The forward direction of the vehicle 20 is the direction of movement of the vehicle 20 when the vehicle 20 is engaged in forward drive with wheels of the vehicle 20 aligned straight.

The vehicle 20 may be any suitable type of automobile, e.g., a passenger or commercial automobile such as a sedan, a coupe, a truck, a sport utility, a crossover, a van, a minivan, a taxi, a bus, etc. The vehicle 20, for example, may be autonomous. In other words, the vehicle 20 may be autonomously operated such that the vehicle 20 may be driven without constant attention from a driver, i.e., the vehicle 20 may be self-driving without human input.

The vehicle 20 defines the longitudinal axis A1 which extends between a front and a rear of the vehicle 20. The vehicle 20 defines the vertical axis A2 which extends between a top and a bottom of the vehicle 20. The vehicle 20 defines a lateral axis A3 which extends between a right side and a left side of the vehicle 20. The longitudinal axis A1, the vertical axis A2, and the lateral axis A3 are perpendicular relative to each other.

With reference to FIGS. 1 and 6-9, and the harness 32 may control kinematics of the occupant 42 seated on a personal mobility device 44 in the vehicle 20. Movement of the harness 32 along the first track 24, the second track 26, the third track 28, and/or the fourth track 30 may aid ease ingress and egress of the occupant 42 and the personal mobility device 44 into and out of the vehicle 20. The harness 32 may be connected to the vehicle body 22 via the first track 24, the second track 26, the third track 28, and the fourth track 30 to control kinematics of the occupant 42 of the personal mobility device 44. The first webbing 34 may extend over one shoulder of the occupant 42, the second webbing 36 may extend over the over the other shoulder of the occupant 42, and the third webbing 38 and the fourth webbing 40 may provide a lap belt for the occupant 42. The harness 32, e.g., the first webbing 34, the second webbing 36, the third webbing 38, and the fourth webbing 40 may be woven, e.g., polyester, or any suitable material. The first webbing 34 and the second webbing 36 may be fixed to the third webbing 38 and the fourth webbing 40, e.g., via stitching or any suitable structure. The third webbing 38 and the fourth webbing 40 may be formed of a single continuous weave of material. The first webbing 34, the second webbing 36, the third webbing 38, and the fourth webbing 40 may be fixed to each other with any suitable construction and structures.

The first webbing 34 may extend from a first retractor 46 and the second webbing 36 may extend from a second retractor 48. The first retractor 46 and the second retractor 48 provide payout and retraction of the first webbing 34 and the second webbing 36, e.g., via rotation of a spool of the respective first retractor 46 or second retractor 48 in one direction or another. The first webbing 34 and the second webbing 36 may be wound around the spools of the first retractor 46 and the second retractor 48. The first retractor 46 and the second retractor 48 may include return springs, e.g., torsion springs, that urge the spools in a retraction direction. The first retractor 46 and the second retractor 48 may include blocking devices that selectively inhibit payout, e.g., selectively inhibit rotation of the stools. The blocking devices may include, for example, an inertia clutch or pawl, or any other suitable structure that inhibits payout, e.g., in response to certain accelerations of the vehicle 20, the spools, etc.

The vehicle body 22 includes, e.g., a roof 50, one or more pillars 52, a floor 54, etc. The roof 50 and the floor 54 may extend along the longitudinal axis A1 and the lateral axis A3. The roof 50 is above and spaced from the floor 54 along the vertical axis A2. The pillars 52 may extend from the roof 50 to the floor 54. The vehicle body 22 defines a passenger compartment to house occupants, if any, of the vehicle 20. The passenger compartment may extend across the vehicle 20, i.e., from the right side to the left side of the vehicle 20. The passenger compartment includes a front end and a rear end with the front end being in front of the rear end during forward movement of the vehicle 20. The passenger compartment is between the roof 50 and the floor 54 along the vertical axis A2.

The vehicle body 22 may be of a unibody construction in which a vehicle frame is unitary with the vehicle body 22, as shown in the example in the Figures. As another example, the vehicle body 22 and vehicle frame may have a body-on-frame construction (also referred to as a cab-on-frame construction) in which the vehicle body 22 and vehicle frame are separate components, i.e., are modular, and the vehicle body 22 is supported on and affixed to the vehicle frame. Alternatively, the vehicle frame and vehicle body 22 may have any suitable construction. The vehicle frame and vehicle body 22 may be of any suitable material, for example, steel, aluminum, and/or fiber-reinforced plastic, etc. The vehicle body 22 may include body panels partially defining an exterior of the vehicle 20. The body panels may present a class-A surface, e.g., a finished surface exposed to view by a customer and free of unaesthetic blemishes and defects.

The roof 50 may include cross bars 56, an exterior roof body panel, a headliner 58, etc. The headliner 58 includes a class-A surface facing the passenger compartment of the vehicle 20. The headliner 58 may include, e.g., a rigid panel, a padding such as foam, a covering such as fabric, etc. The headliner 58 is supported by the vehicle body 22. For example, the headliner 58 may be fixed to the cross bars 56 with fasteners, adhesive, or any other suitable structure. The headliner 58 may have a first slit 60 and a second slit 62 (shown in FIG. 2) extending along the longitudinal axis A1. The first slit 60 and the second slit 62 may extend completely through the headliner 58, e.g., from a bottom surface to a top surface of the headliner 58.

The pillars 52 are spaced from each other along the lateral axis A3, For example, one pillar 52 may be at the right side of the vehicle body 22 and another pillar 52 may be at the left side of the vehicle body 22. The pillars 52 extend, e.g., from the roof 50 to the floor 54 along the vertical axis A2. The vehicle body 22 may include front pillars 52 and middle pillars 52 on each side of the vehicle 20. The front pillars 52 may extend between a windshield and front doors for the vehicle 20. In other words, the front pillars 52 may be disposed at a front end of the passenger compartment of the vehicle body 22. The middle pillars 52 may extend behind the front doors, e.g., between adjacent doors. In other words, the middle pillars 52 may be spaced from the front pillars 52 by a front door opening. The vehicle 20 may include additional pillars 52, e.g., an additional middle pillar 52, rear pillars 52.

The floor 54 of the vehicle 20 supports objects, such as seats, occupants, a personal mobility device 44, etc., within the passenger compartment. The floor 54 may extend from the front end to the rear end of the passenger compartment and from the right side to the left side of the vehicle 20.

A floor mount 66 configured to engage and secure the personal mobility device 44 within the passenger compartment may be fixed to the vehicle body 22 under the first track 24 and the second track 26 along the vertical axis A2, and between the third track 28 and the fourth track 30 along the lateral axis A3. The floor mount 66 may include channels 68 engageable with wheels of the personal mobility device 44. Specifically, the channels 68 are sized and shaped to receive wheels of the personal mobility device 44 to resist lateral movement of the personal mobility device 44 during operation of the vehicle 20. The channels 68 may be spaced from each other along the lateral axis A3 and parallel to each other along the longitudinal axis A1. The channels 68 may be fixed to the floor 54 via fasteners, welds, etc. The floor mount 66 may include any suitable number of latches 70, tethers, etc., to secure the wheels or other structure of the personal mobility device 44 to the vehicle 20 and limit relative movement therebetween. The latches 70 may limit the movement of the personal mobility device 44 in the channels 68, e.g., via engagement with the wheels. The latches 70 may be electronic or manual, e.g., each of the latches 70 may include a solenoid. Actuation of the solenoid, e.g., in response to a command from a computer 72 of the vehicle 20, may engage the latches 70 with the wheel.

The personal mobility device 44 may be of any suitable type that supports a seated occupant 42 and provides mobility to the seated occupant 42, i.e., the personal mobility device 44 transports the seated occupant 42 outside of the vehicle 20 and moves the seated occupant 42 in the passenger compartment during ingress to and egress from the vehicle 20. The personal mobility device 44 supports the seated occupant 42 in the passenger compartment during operation of the vehicle 20. The personal mobility device 44 may include a frame that supports other components of the personal mobility device 44. The personal mobility device 44 may include handles, e.g., for pushing the personal mobility device 44. The personal mobility device 44 may include wheels, as described above. As another example, the personal mobility device 44 may include a continuous track. In such an example, the continuous track is in contact with ground and personal mobility device 44 may include wheels that transmit force to the continuous track. The personal mobility device 44 may include a motor operably connected to the wheels and a battery that provides power to the motor. The personal mobility device 44 may be for example, a wheelchair, an electric scooter, etc.

The vehicle 20 may include a center pillar 74 between the first pillar 52 and the second pillar 52 along the lateral axis A3, e.g., disposed in the passenger compartment. The center pillar 74 is elongated along the vertical axis A2. For example, the center pillar 74 may extend from the floor 54 to the roof 50. The center pillar 74 may be fixed to the vehicle body 22, e.g., to the floor 54 and the roof 50. The center pillar 74 may include a frame 76 (shown in FIG. 5). The frame 76 may be fixed to the floor 54 and the roof 50, e.g., to transfer force therebetween. The frame 76 may be metal, plastic, or any suitable material. The center pillar 74 may include a pad 78 and a cover 80 that isolate the frame 76 from the passenger compartment. The pad 78 may be between the cover 80 and the frame 76. The cover 80 may include upholstery, such as, cloth, leather, faux leather, or any other suitable material. The cover 80 may be plastic or any suitable material. The pad 78 may be foam or any other suitable material. The cover 80 may include a slit 82 extending along the vertical axis A2. The slit 82 may extend through the cover 80, e.g., from an outer surface to an inner surface. The slit 82 may extend along the pad 78 under the cover 80.

The first track 24, the second track 26, the third track 28, and the fourth track 30 enable movement of the harness 32 relative to the vehicle body 22 while the harness 32 is connected to the vehicle body 22, e.g., via shuttles 84, 86, 88, 90 or other suitable structure that travel along the first track 24, the second track 26, the third track 28, and the fourth track 30. The first track 24 and the second track 26 may permit movement, e.g., of a first shuttle 84 and a second shuttle 86, along the longitudinal axis A1 and inhibit movement along the lateral axis A3 and the vertical axis A2. The third track 28 and the fourth track 30 may permit movement, e.g., of a third shuttle 88 and a fourth shuttle 90, along the vertical axis A2 and inhibit movement along longitudinal axis A1 and the lateral axis A3. Each of the shuttles 84, 86, 88, 90 may, for example, slide along a respective internal channel 92 of the first track 24, the second track 26, the third track 28, or the fourth track 30. The first track 24, the second track 26, the third track 28, and the fourth track 30 may be metal or any suitable material.

Figure 2:
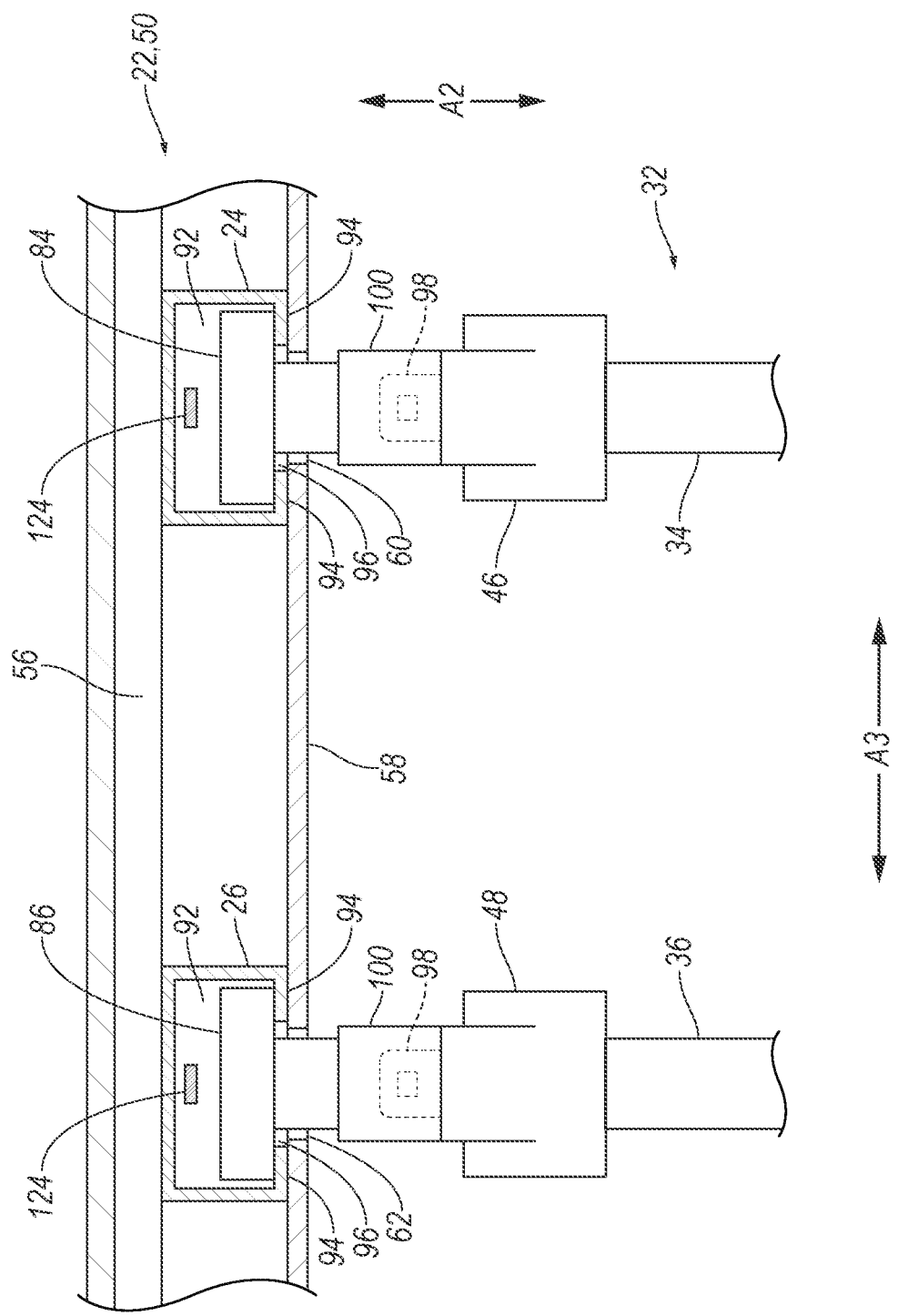
FIG. 2 is a diagrammatic cross section view of a roof of the vehicle.
Figure 5:
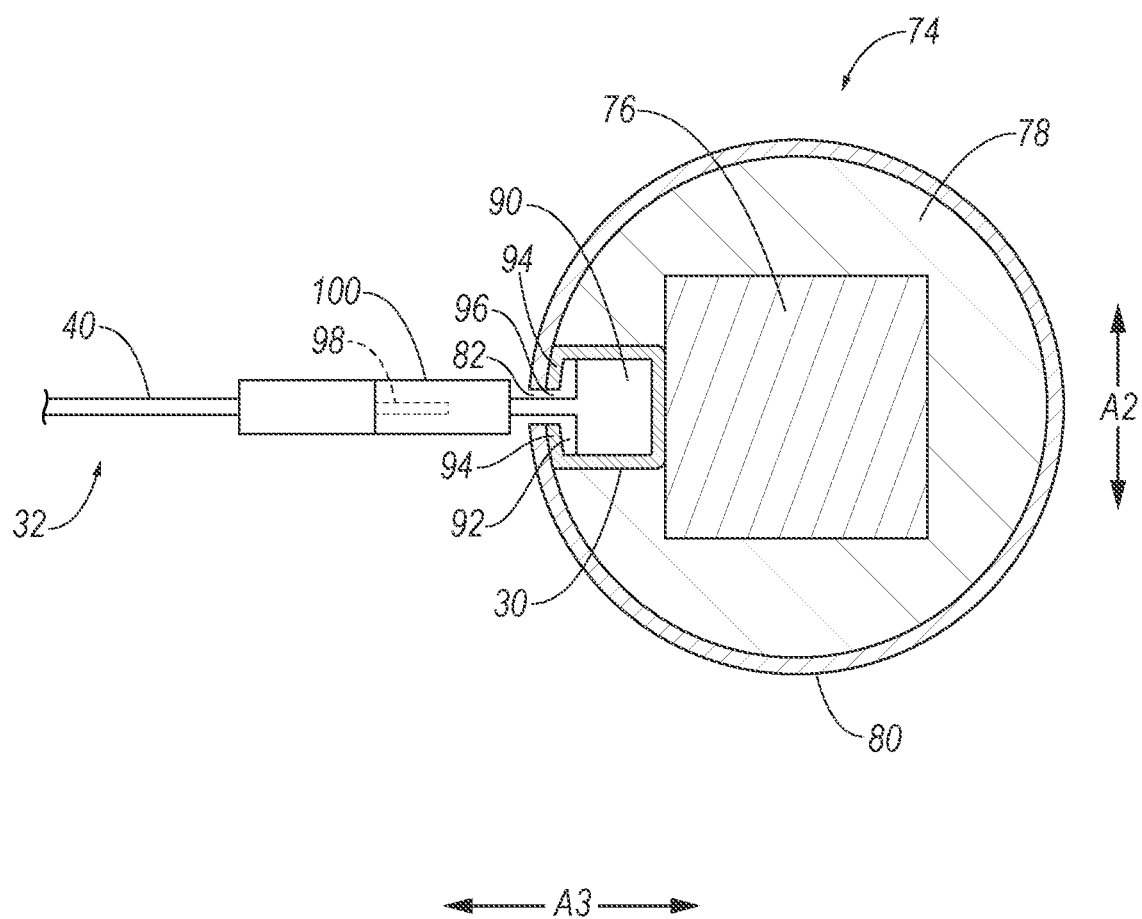
FIG. 5 is a diagrammatic cross section view of the track of FIG. 4 supported by a pillar of the vehicle.
Figure 6:
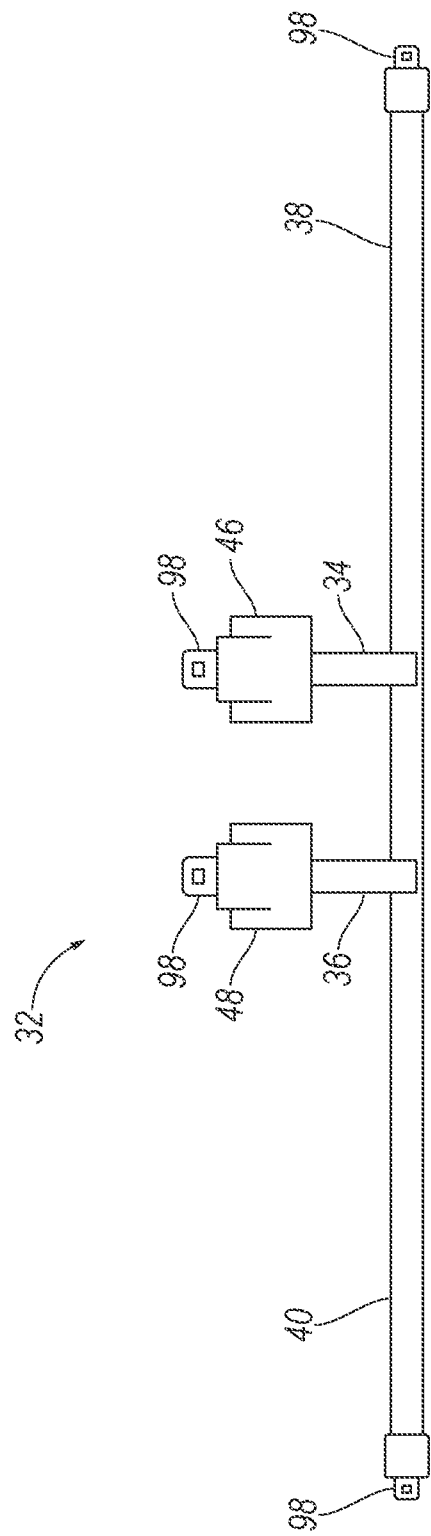
FIG. 6 is a front view of the harness separate from the vehicle.

With reference to FIGS. 2 and 5, the tracks 24, 26, 28, 30 may be C-shaped in cross-section, or any suitable shape. The tracks 24, 26, 28, 30 may each include a pair of lips 94 extending toward each other and defining a passage 96 therebetween. The shuttles 84, 86, 88, 90 (or other structure) may extend through the passages 96, to enable connection of the first webbing 34, the second webbing 36, the third webbing 38, or the fourth webbing 40 to the respective shuttle 84, 86, 88, 90.

With reference to FIGS. 1 through 3B, the first track 24 and the second track 26 control movement of the first webbing 34 and the second webbing 36, respectively. The first track 24 and the second track 26 are elongated along the longitudinal axis A1. In other words, the first track 24 and the second track 26 are longest along the longitudinal axis A1. The passages 96 of the first track 24 and the second track 26 may be elongated along the longitudinal axis A1. The first track 24 and the second track 26 are supported by the vehicle body 22. For example, the first track 24 and the second track 26 may be fixed to cross bars 56 of the roof 50 via fasteners, weld, or any suitable structure. The first track 24 and the second track 26 may be under the headliner 58, e.g., between the headliner 58 and the cross bars 56. The first slit 60 and the second slit 62 of the headliner 58 may extend along the first track 24 and the second track 26. The first track 24 and the second track 26 may be aligned with the first slit 60 and the second slit 62 along the lateral axis A3. In other words, the first slit 60 and the second slit 62 may overlap the first track 24 and the second track 26.

Figure 4:
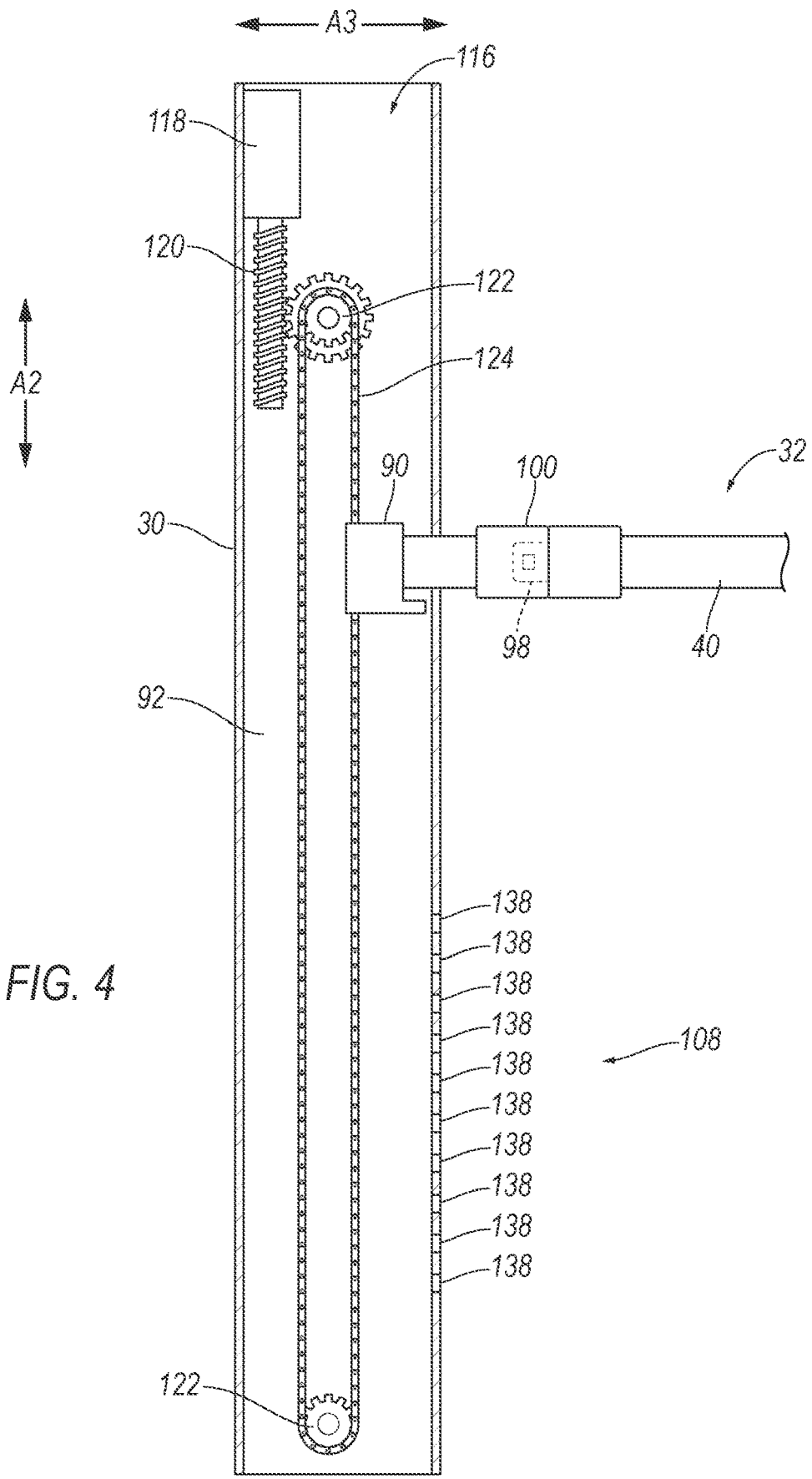
FIG. 4 is a diagrammatic cross section view of another track supported by the roof with the harness at the first position.

With reference to FIGS. 1 and 4 through 5, the third track 28 and the fourth track 30 control movement of the third webbing 38 and fourth second webbing 36, respectively. The third track 28 and the fourth track 30 are elongated along the vertical axis A2. In other words, the third track 28 and the fourth track 30 are longer as measured on the vertical axis A2 than on the lateral axis A3 and on the longitudinal axis A1. The passages 96 of the third track 28 and the fourth track 30 are elongated along the vertical axis A2. The third track 28 and the fourth track 30 are supported by the vehicle body 22. For example, the third track 28 may be supported by one of the pillars 52, e.g., fixed thereto with fasteners or other suitable structure. The fourth track 30 may be supported by the center pillar 74, e.g., by the frame 76 under the cover 80. The fourth track 30 may be under or within the pad 78. For example, the fourth track 30 may be fixed to the frame 76 with fasteners, weld, or any suitable structure. The slit 82 of the cover 80 and the pad 78 may extend along the fourth track 30. The fourth track 30 may be aligned with the slit 82 along the longitudinal axis A1. In other words, the slit 82 may overlap the fourth track 30.

The first retractor 46 and the second retractor 48 may be releasably engageable with the first track 24 and the second track 26 to enable the harness 32 to be removed from the vehicle 20. For example, the first retractor 46 may be engaged with the first shuttle 84, and the second retractor 48 may be engaged with the second shuttle 86, via latch plates 98 engaged with latch plate buckles 100. The latch plates 98 are engageable with the latch plate buckles 100 to secure the harness 32 relative to the vehicle body 22. The latch plate buckle 100 may include a latch, or any other suitable structure, to engage the latch plate 98. A user may insert the latch plate 98 into the latch plate buckle 100 to engage the latch plate 98 with latch plate buckle 100. The latch plate buckle 100 may include a button, actuator, etc., to disengage the latch plate 98 from the latch plate buckle 100, e.g., in response to input from the user. The latch plates 98 may be fixed to the first retractor 46 and the second retractor 48, e.g., via fastener, weld, or other suitable structure. The latch plate buckles 100 may be fixed to the first shuttle 84 and the second shuttle 86, e.g., via fastener, weld, or other suitable structure. The first retractor 46 is movable along the first track 24 and the second retractor 48 is movable along the second track 26, e.g., when the latch plates 98 are engaged with the latch buckles.

The third webbing 38 may be releasably engageable with the third track 28 and the fourth webbing 40 may be releasably engageable with the fourth track 30, e.g., via latch plates 98 and latch plate buckles 100 and/or other suitable structure. The latch plates 98 can be fixed to distal ends of the third webbing 38 and/or the fourth webbing 40. The latch plates 98 can be slidably mounted on the third webbing 38 and/or the fourth webbing 40, e.g., with a stop bar or other suitable structure to selectively permit size adjustment of the lap band provided by the third webbing 38 and the fourth webbing 40. The latch plate buckles 100 may be fixed to the third shuttle 88 and the fourth shuttle 90. The third webbing 38 is movable along the third track 28 and the fourth webbing 40 is movable along the fourth track 30, e.g., when the latch plates 98 are engaged with the latch buckles.

Figure 7:
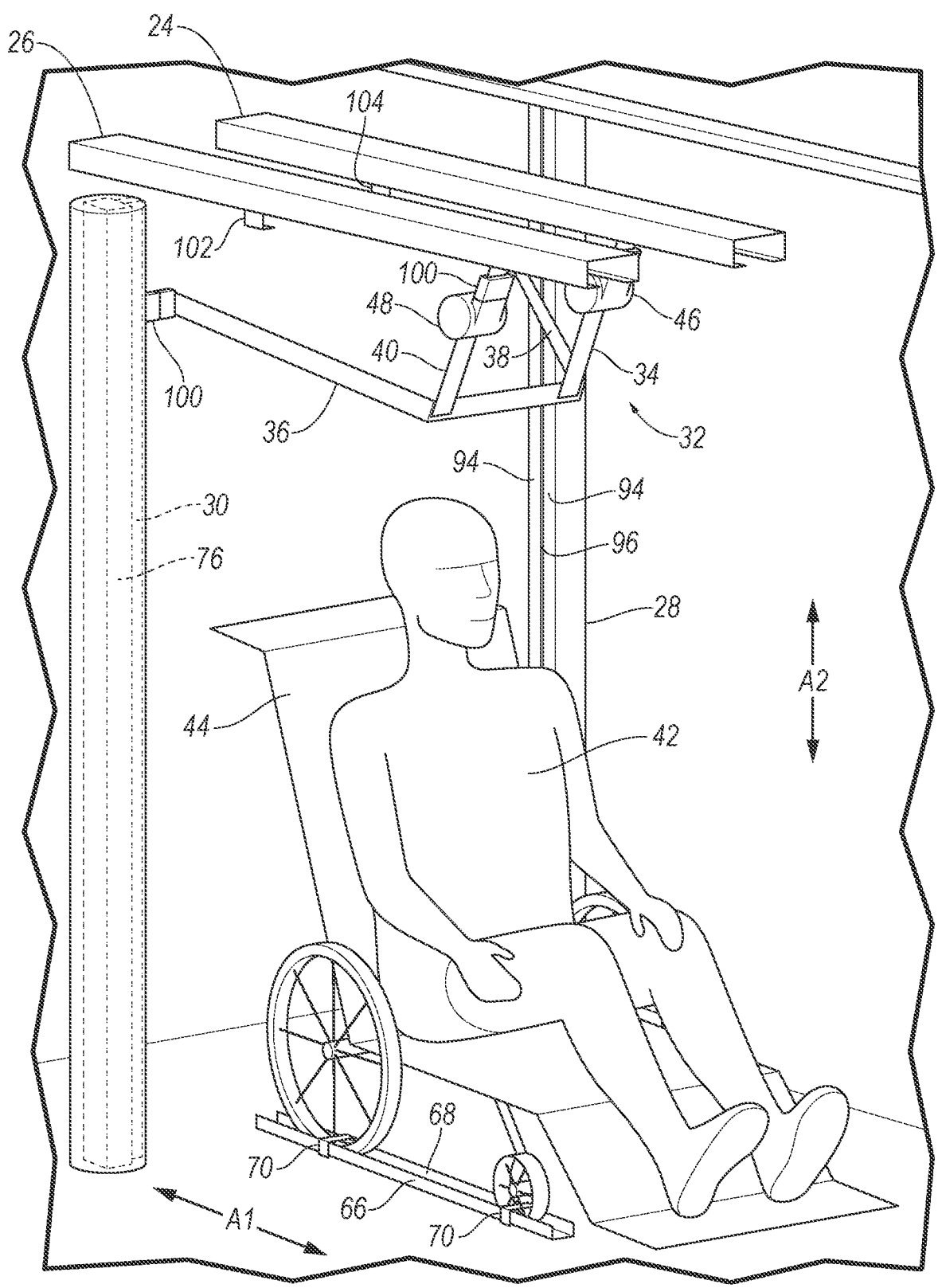
FIG. 7 is a diagrammatic perspective view of a portion of the vehicle with a personal mobility device and with the harness in the first position.
Figure 9:
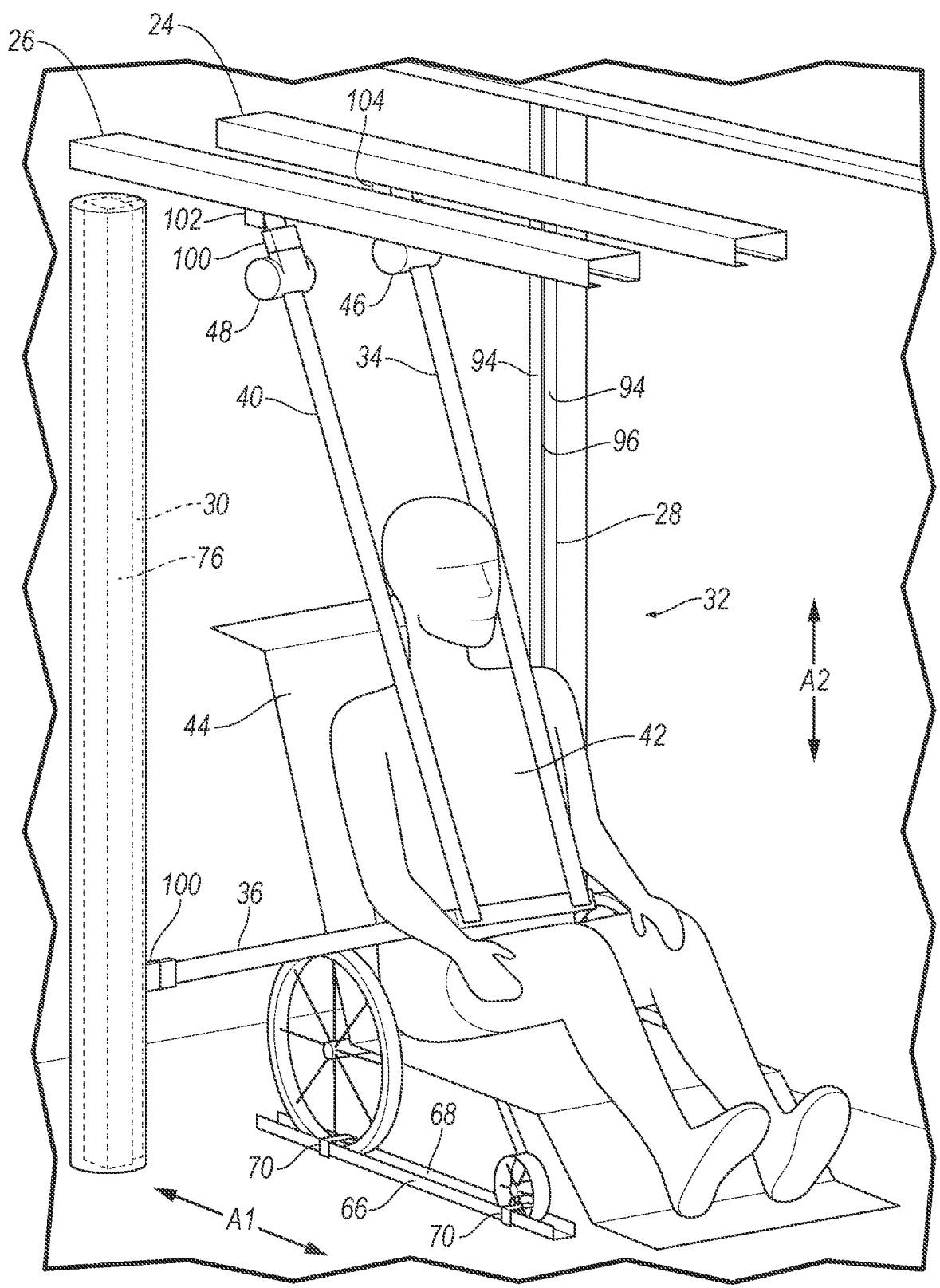
FIG. 9 is a diagrammatic perspective view of the portion of the vehicle with the personal mobility device and with the harness in the second position.

The harness 32 is movable relative to the vehicle body 22 from a first position, shown in FIGS. 1 and 7, to a second position, shown in FIG. 9. For example, the first webbing 34 and the second webbing 36 may be longitudinally movable between first positions and second positions, and the third webbing 38 and the fourth webbing 40 may be movable vertically between first positions and second positions. The harness 32 at the first position may permit ingress and egress of the personal mobility device 44 and occupant 42 thereof to and from the vehicle 20. The harness 32 at the second position may control kinematics of the occupant 42, e.g., with the first webbing 34 and the second webbing 36 extending over the shoulders of the occupant 42 and the third webbing 38 and the fourth webbing 40 extending across a lap of the occupant 42.

Figure 3:
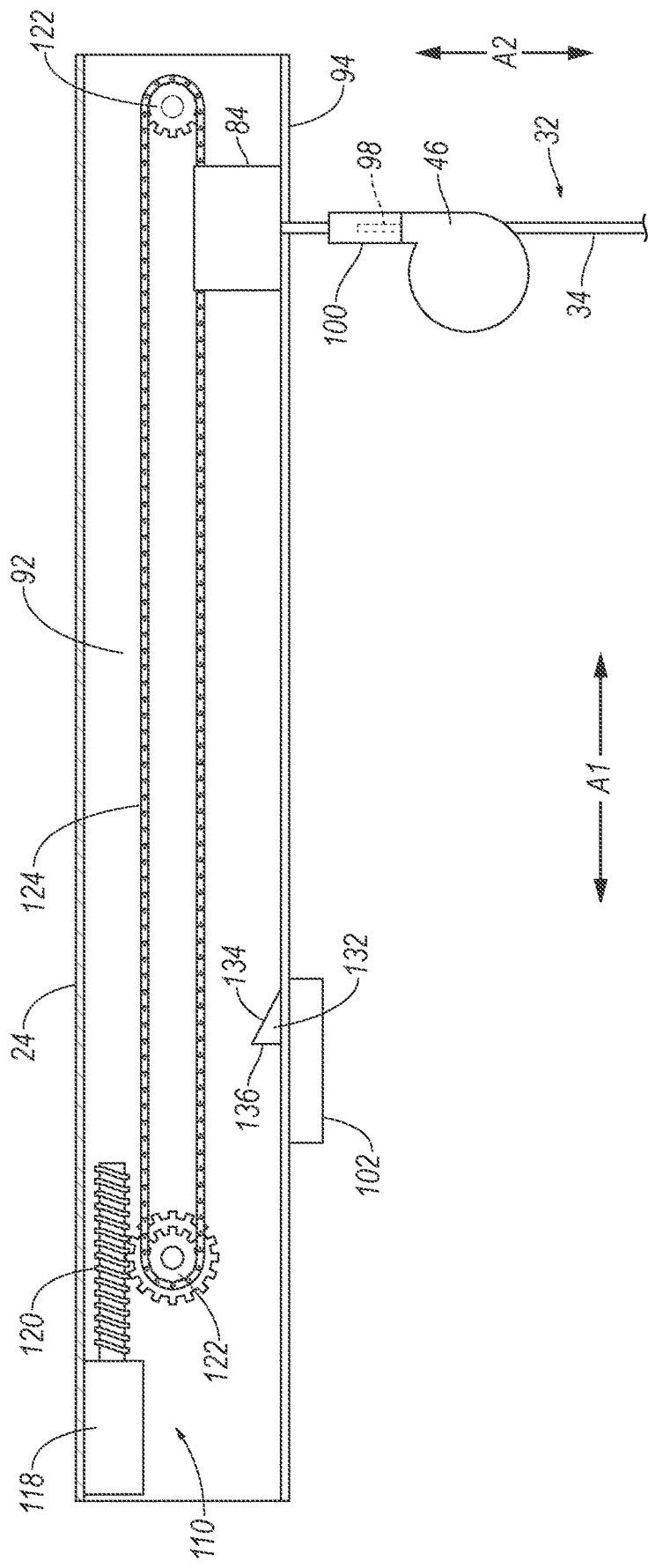
FIG. 3 is a diagrammatic cross section view of a track supported by the roof with the harness at the first position.

The first webbing 34 and the second webbing 36 are movable along the first track 24 and the second track 26 from the first positions, shown in FIGS. 1, 3, 7 and 8 to the second positions that are rearward of the first positions, shown in FIGS. 3A, 3B, and 9. For example, the first retractor 46 and the first webbing 34 may move to the first position and the second position concurrent with the first shuttle 84 when the latch plate 98 fixed to the first retractor 46 is engaged with the latch plate buckle 100 fixed to the first shuttle 84. The second retractor 48 and the second webbing 36 may move to the first position and the second position concurrent with the second shuttle 86 when the latch plate 98 fixed to the second retractor 48 is engaged with the latch plate buckle 100 fixed to the second shuttle 86.

A first stop 102 and a second stop 104 may be included to maintain the first webbing 34 and the second webbing 36, respectively, at the second positions of the first track 24 and the second track 26. For example, the first stop 102 may selectively inhibit movement of the first shuttle 84 along the first track 24 from the second position forward toward the first position. The second stop 104 may selectively inhibit movement of the second shuttle 86 along the second track 26 from the second position forward toward the first position. The first stop 102 and the second stop 104 may include each a tooth, e.g., a ratchet tooth, that permits movement of the respective shuttle there past in one direction and engages such shuttle to block movement in an opposite direction. The tooth 132 may be wedge-shaped and include a sloped surface 134 and a normal surface 136. The tooth 132 may be retractable from an extended position, shown in FIG. 3A, to a retracted position, shown in FIG. 3B, e.g., to enable movement of the respective shuttle in the opposite direction. The tooth 132 may retract in response to a command from a computer 72 of the vehicle 20. For example, each stop may include a spring urging the tooth 132 to the extended position and a solenoid or the like connected to the tooth 132 that moves the tooth 132 to the retracted position. Movement of the tooth 132 to the retracted position may be controlled by the computer 72. The first stop 102 and the second stop 104 may include, for example, an engagement feature, such as a protrusion, hole, notch, or the like, on the first track 24 and/or the second track 26 (not shown). The engagement feature engages with the respective shuttle to inhibit movement thereof. For example, the engagement feature may blockingly abut a portion of the shuttle, e.g., when a certain load is applied to the respective webbing. The certain load may deform the track, the shuttle, or other structure to bring the shuttle and the engagement feature into engagement feature.

The third webbing 38 and the fourth webbing 40 are movable along the third track 28 and the fourth track 30 from first positions, shown in FIGS. 1, 4 and 7, to second positions, shown in FIGS. 4A, 4B, 8 and 9, that are downward of the first positions. For example, the third webbing 38 may move to the first position and the second position concurrent with the third shuttle 88 when the latch plate 98 attached to the third webbing 38 is engaged with the latch plate buckle 100 fixed to the third shuttle 88. The fourth webbing 40 may move to the first position and the second position concurrent with the fourth shuttle 90 when the latch plate 98 attached to the fourth webbing 40 is engaged with the latch plate buckle 100 fixed to the fourth shuttle 90. Although shown at only a single distance, the third webbing 38 and the fourth webbing 40 at the second position may be at various distances from the roof 50 along the vertical axis A2. For example, the second positions may be based on a size, position, etc., of the occupant 42 of the personal mobility device 44.

Figure 4A:
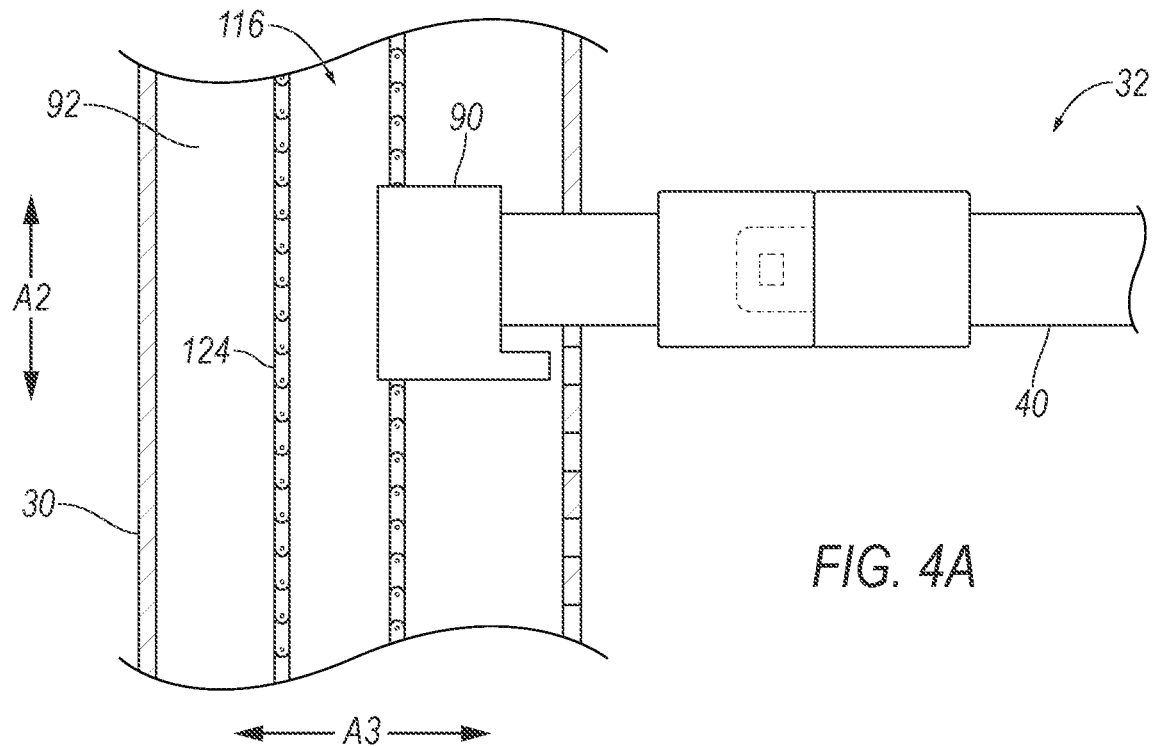
FIG. 4A is a diagrammatic cross section view of a portion of the track of FIG. 4 the harness at a second position.
Figure 4B:
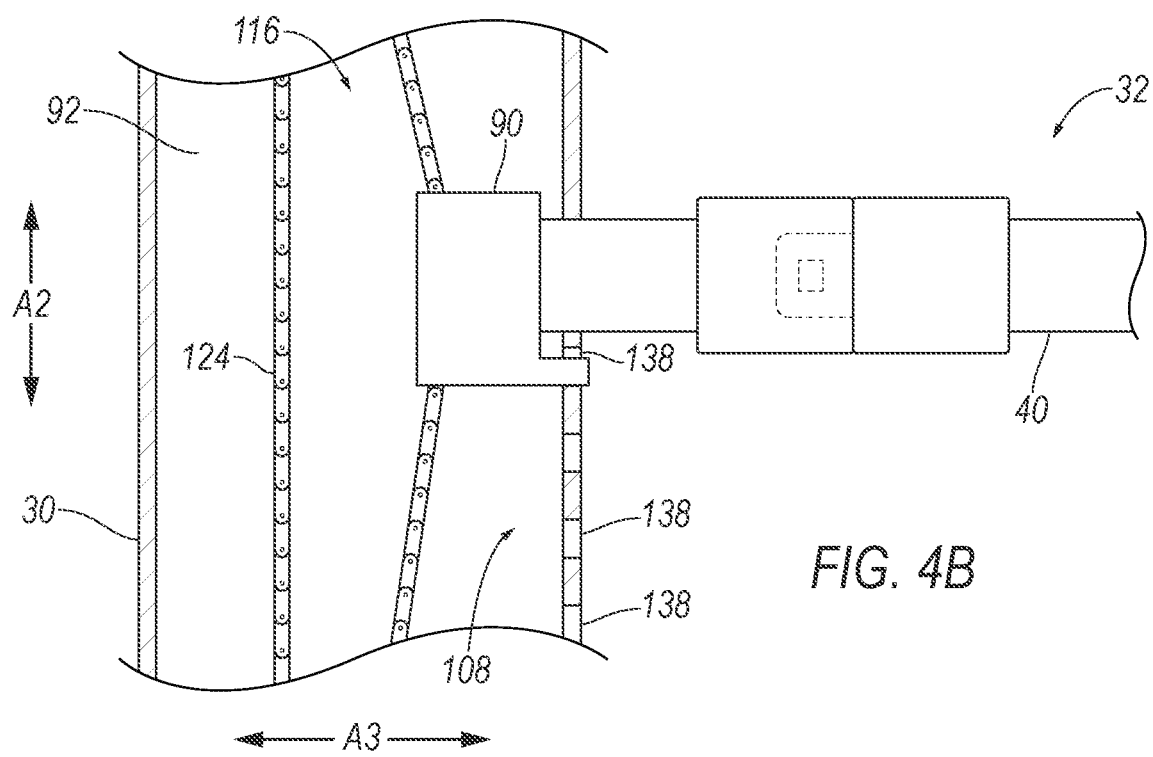
FIG. 4B is a diagrammatic cross section view of the portion of the track of FIG. 4 the harness at the second position and engaged with a stop.

One or more third stop 106 and one or more fourth stop 108 may be included to maintain the third webbing 38 and the fourth webbing 40, respectively, at the second positions along the third track 28 and the fourth track 30. The third stops 106 and the fourth stops 108 may be spaced along the vertical axis A2, e.g., to engage the third shuttle 88 and the fourth shuttle 90 at various distances from the roof 50. The third stops 106 may selectively inhibit movement of the third shuttle 88 along the third track 28. The fourth stops 108 may selectively inhibit movement of the fourth shuttle 90 along the fourth track 30. The third stops 106 and the fourth stops 108 may include a plurality of wedge-shaped teeth. The teeth may be retractable. Each stop may include a spring and a solenoid or the like connected to the tooth and controlled by the computer 72. The third stops 106 and the fourth stops 108 may include, for example, an engagement features 138, such as a protrusions, holes, notches, or the like, on the third track 28 and/or the fourth track 30. One of the engagement features 138 engages with the respective shuttle to inhibit movement thereof. For example, the shuttle 90 and move from being spaced from the engagement feature 138, as shown in FIG. 4A, into abutment with the engagement feature 138, as shown in FIG. 4B. The shuttle 90 may be moved into abutment, e.g., when a certain load is applied to the respective webbing. The certain load may deform the track, the shuttle, or other structure to bring the shuttle 90 and the engagement feature 138 into abutment.

The vehicle 20 may include actuators 110, 112, 114, 116 that move the harness 32 relative to the vehicle 20. For example, the vehicle 20 may include a first actuator 110 configured to move the first webbing 34 along the first track 24 and/or a second actuator 112 configured to move the second webbing 36 along the second track 26, as shown in FIG. 3. The vehicle 20 may include a third actuator 114 configured to move the third webbing 38 along the third track 28, and/or a fourth actuator 116 configured to move the fourth webbing 40 along the fourth track 30, as shown in FIG. 4. The actuators 110, 112, 114, 116 may move the harness 32, e.g., in response to a command from the computer 72 of the vehicle 20. The actuators 110, 112, 114, 116 that may include a motor 118 coupled to a worm gear 120 such that torque from the motor 118 is transferred to the worm gear 120. The actuators 110, 112, 114, 116 may include one or more pullies 122 and a chain 124 on the pullies 122. The chain 124 may be fixed to the respective shuttle. The worm gear 120 may be engaged with the chain 124 such that torque from the motor 118 rotates the pullies 122 and moves the chain 124. The actuators 110, 112, 114, 116 may include any other suitable mechanical, electromechanical, and/or hydraulic structure for moving the webbing, including gears, gear reduction systems, rack and pinion, screw drive linear actuator systems, pumps, valves, piston and cylinders, etc.

Figure 10:
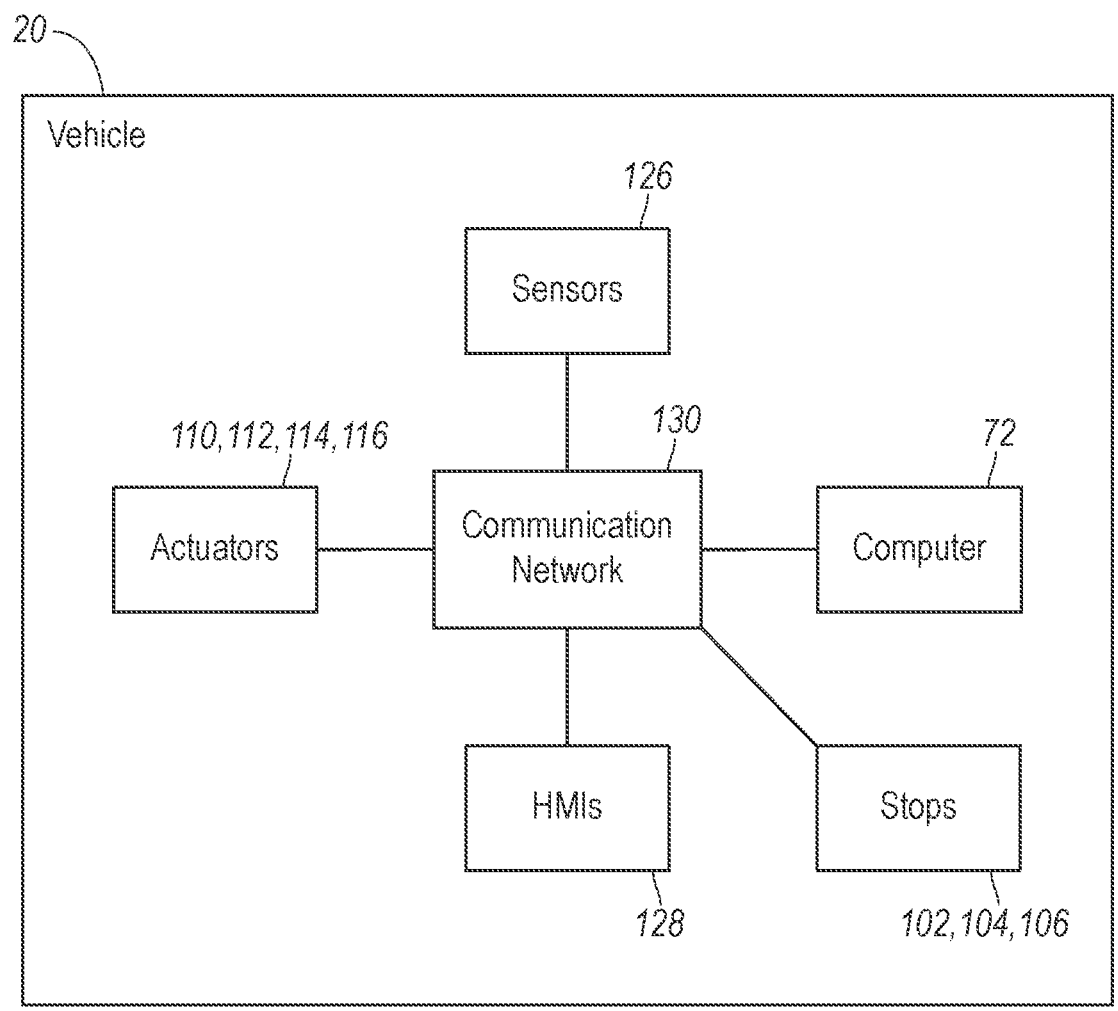
FIG. 10 is a block diagram of components of the vehicle.

With reference to FIG. 10, the vehicle 20 may include one or more sensors 126. The sensors 126 may detect tension of the third webbing 38 and/or the fourth webbing 40. For example, the sensors 126 may include a tension sensor having a strain gage, a piezoelectric sensor, a piezo-resistive sensor, or other suitable structure that can provide information to the computer 72 indicating the tension of the third webbing 38 and/or the fourth webbing 40. The sensors 126 may detect a size and/or position of the occupant 42 of the personal mobility device 44. For example, the sensors 126 may include cameras, proximity sensors, light gates, or other suitable structure that can provide information to the computer 72 indicating the size and/or position of the occupant 42 of the personal mobility device 44 relative to the vehicle body 22. The sensors 126 may be supported by the vehicle body 22 or any suitable structure.

The vehicle 20 may include one or more human-machine-interfaces (HMIs 128). The HMIs 128 present data to and/or receive data from the human operator of the vehicle 20. The HMIs 128 may include dials, digital readouts, screens such as a touch-sensitive display screen, speakers, etc., for providing data to the occupant 42. The HMIs 128 may include one or more buttons, pedals, knobs, keypads, microphones, for receiving data from the occupant 42. The HMIs 128 may include a steering wheel, accelerator pedal, brake pedal, etc.

The computer 72 includes a processor and a memory. The memory includes one or more forms of computer 72 readable media, and stores instructions executable by the processor for performing various operations, processes, and methods as disclosed herein. For example, the computer 72 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 72 may be a restraints control module. In another example, computer 72 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer 72. The memory can be of any type, e.g., hard disk drives, solid state drives, servers, or any volatile or non-volatile media. The memory can store the collected data sent from the sensors 126.

The computer 72 is generally arranged for communications on a communication network 130 that can include a bus in the vehicle 20 such as a controller area network (CAN) or the like, and/or other wired and/or wireless mechanisms. Via the communication network 130, the computer 72 may transmit messages to various devices in the vehicle 20, and/or receive messages (e.g., CAN messages) from the various devices, e.g., the sensors 126, the actuators 110, 112, 114, 116, the HMIs 128, etc. Alternatively or additionally, in cases where the computer 72 comprises a plurality of devices, the communication network 130 may be used for communications between devices represented as the computer 72 in this disclosure.

The computer 72 is programmed to, i.e., the memory stores instructions executable by the processor to, move the webbings 34, 36, 38, 40 along the tracks 24, 26, 28, 30. For example, the computer 72 may transmit a command via the communication network 130 to the first actuator 110 and the second actuator 112 instructing movement of the first shuttle 84 and the second shuttle 86 rearward from the first position to the second position, or vice versa. Similarly, the computer 72 may transmit a command via the communication network 130 to the third actuator 114 and the fourth actuator 116 instructing movement of the third shuttle 88 and the fourth shuttle 90 downward from the first position to the second position, or vice versa.

Figure 8:
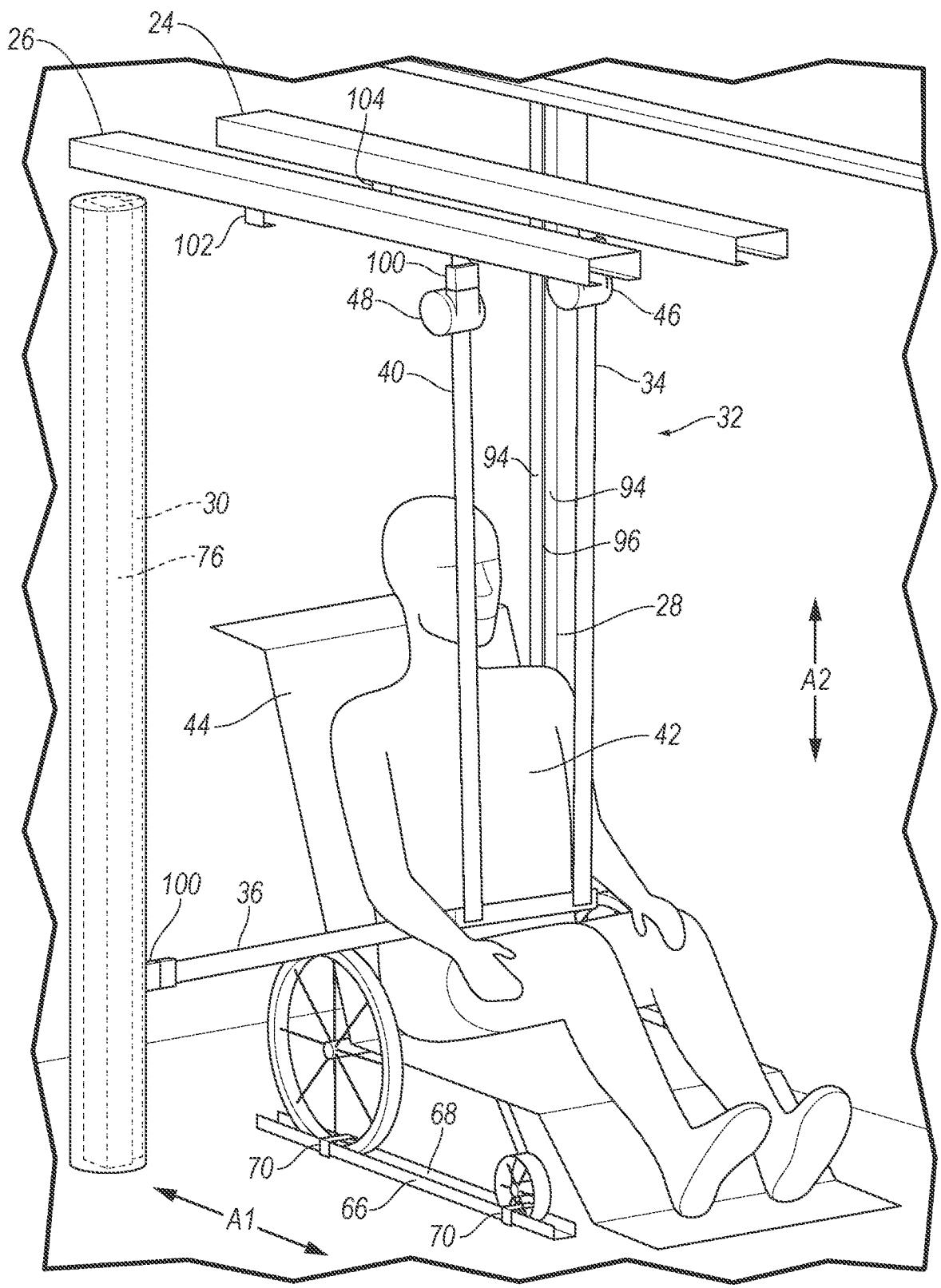
FIG. 8 is a diagrammatic perspective view of the portion of the vehicle with the personal mobility device and with a portion of the harness in the first position and with a portion of the harness at the second position.

The computer 72 may move the webbings 34, 36, 38, 40 along the tracks to move the harness 32 from the first position to the second position, or vise versa. The computer 72 may move the harness 32 from the first position (e.g., with the first webbing 34 and the second webbing 36 at front ends of the first tack and the second track 26, and the third webbing 38 and the fourth webbing 40 at top ends of the third tack and the fourth track 30 track) to the second position by first commanding the third actuator 114 and the fourth actuator 116 to move the third webbing 38 and the fourth webbing 40 away from top ends of the third track 28 and the fourth track 30 toward the floor 54 of the vehicle body 22 to the second positions, as shown in FIG. 8. After the third webbing 38 have been moved downward to the second positions, the computer 72 may command the first actuator 110 and the second actuator 112 to move the first webbing 34 and the second webbing 36 away from front ends of the first track 24 and the second track 26 toward the rear ends to the second positions, as shown in FIG. 9.

The computer 72 may determine the second positions for the third webbing 38 and the fourth webbing 40. For example, the computer 72 may compare tension detected in the third webbing 38 and/or the fourth webbing 40 with a predetermined threshold, and determine that the third webbing 38 and the fourth webbing 40 are at the second positions when data from one or more of the sensors 126 indicates the tension is at or above the predetermined threshold. As another example, the computer 72 may determine the second positions the third webbing 38 and the fourth webbing 40 based on a detected size and/or position of the occupant 42 as indicated by data collected by the sensors 126. For example, the size and/or position of the occupant 42 may be identified in an image captured by a camera, and/or a distance of a lap the occupant 42 from the floor 54 may be indicated from proximity sensor data.

The computer 72 may move the harness 32 from the first position to the second position, i.e., move the first webbing 34, the second webbing 36, the third webbing 38, and the fourth webbing 40, in response to detecting the occupant 42 under the first track 24 and the second track 26 and between the third track 28 and the fourth track 30. The computer 72 may detects the occupant 42 under the first track 24 and the second track 26 and between the third track 28 and the fourth track 30 based on data from the sensors 126. For example, image data from a camera and/or proximity sensor data may indicate the occupant 42 is under the first track 24 and the second track 26 and between the third track 28 and the fourth track 30. The computer 72 may use other sensor data to detect the occupant 42 under the first track 24 and the second track 26 and between the third track 28 and the fourth track 30, including conventional data collection and processing techniques. The computer 72 may move the harness 32 from the second position, e.g., in response to receiving data from one or more HMIs indicating input from a user.

In the drawings, the same reference numbers indicate the same elements. With regard to the media, processes, systems, methods, etc., described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted.

The adjectives "first" and "second" are used throughout this document as identifiers and do not signify importance, order, or quantity.

Computer executable instructions may be compiled or interpreted from computer programs created using a variety of programming languages and/or technologies, including, without limitation, and either alone or in combination, Java, C, C+, Visual Basic, Java Script, Perl, HTML, etc. In general, a processor e.g., a microprocessor receives instructions, e.g., from a memory, a computer readable medium, etc., and executes these instructions, thereby performing one or more processes, including one or more of the processes described herein. Such instructions and other data may be stored and transmitted using a variety of computer readable media. A file in a networked device is generally a collection of data stored on a computer readable medium, such as a storage medium, a random-access memory, etc. A computer readable medium includes any medium that participates in providing data e.g., instructions, which may be read by a computer. Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Use of in "response to," "based on," and "upon determining" herein indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle, comprising:
a vehicle body having a roof with cross bars;
a first track and a second track fixed at the cross bars, the first track and the second track elongated along a longitudinal axis;
a third track and a fourth track supported by the vehicle body, the third track and the fourth track elongated along a vertical axis; and
a harness having a first webbing movable along the first track, a second webbing movable along the second track, a third webbing movable along the third track, and a fourth webbing movable along the fourth track.

2. The vehicle of claim 1, further comprising a computer having a processor and a memory storing instructions executable by the processor to move the third webbing and the fourth webbing away from top ends of the third track and the fourth track toward a floor of the vehicle body.

3. The vehicle of claim 2, wherein the instructions include instructions to move the first webbing and the second webbing away from front ends of the first track and the second track toward rear ends after moving the third webbing and the fourth webbing downward.

4. The vehicle of claim 3, wherein the instructions include instructions to move the first webbing, the second webbing, the third webbing, and the fourth webbing in response to detecting an occupant under the first track and the second track and between the third track and the fourth track.

5. The vehicle of claim 1, further comprising a first retractor movable along the first track and a second retractor movable along the second track, the first webbing extending from the first retractor, and the second webbing extending from the second retractor.

6. The vehicle of claim 1, wherein the first webbing and the second webbing are movable from first positions to second positions that are rearward of the first positions, and further comprising a first stop and a second stop that maintains the first webbing and the second webbing at the second positions.

7. The vehicle of claim 1, further comprising an actuator configured to move the first webbing along the first track.

8. The vehicle of claim 7, wherein the actuator includes a motor coupled to a worm gear.

9. The vehicle of claim 1, further comprising a floor mount fixed to the vehicle body under the first track and the second track and between the third track and the fourth track.

10. The vehicle of claim 9, further comprising a personal mobility device secured to the floor mount.

11. The vehicle of claim 9, wherein the floor mount includes channels engageable with wheels of a personal mobility device.

12. The vehicle of claim 1, wherein the vehicle body includes a first pillar and a second pillar spaced from each other along a lateral axis, the third track supported by the first pillar.

13. The vehicle of claim 12, further comprising a center pillar between the first pillar and the second pillar along the lateral axis, the fourth track supported by the center pillar.

14. The vehicle of claim 13, wherein the center pillar includes a frame and a cover, the fourth track supported by the frame under the cover.

15. The vehicle of claim 14, wherein the cover includes a slit extending along the fourth track.

16. The vehicle of claim 1, further comprising a stop that limits movement of the third webbing along the third track.

17. The vehicle of claim 1, further comprising a headliner supported by the vehicle body, the headliner having a first slit extending along the first track and a second slit extending along the second track.

18. A vehicle, comprising:
a vehicle body;
a first track and a second track supported by the vehicle body, the first track and the second track elongated along a longitudinal axis;
a third track and a fourth track supported by the vehicle body, the third track and the fourth track elongated along a vertical axis;
a harness having a first webbing movable along the first track, a second webbing movable along the second track, a third webbing movable along the third track, and a fourth webbing movable along the fourth track; and
a first retractor movable along the first track and a second retractor movable along the second track, the first webbing extending from the first retractor, and the second webbing extending from the second retractor.

19. The vehicle of claim 18, wherein the first retractor and the second retractor are releasably engaged with the first track and the second track.

20. A vehicle, comprising:
a vehicle body;
a first track and a second track supported by the vehicle body, the first track and the second track elongated along a longitudinal axis;
a third track and a fourth track supported by the vehicle body, the third track and the fourth track elongated along a vertical axis;
a harness having a first webbing movable along the first track, a second webbing movable along the second track, a third webbing movable along the third track, and a fourth webbing movable along the fourth track; and
a headliner supported by the vehicle body, the headliner having a first slit extending along the first track and a second slit extending along the second track.

* * * * *